US008620468B2

(12) United States Patent
Moyne

(10) Patent No.: US 8,620,468 B2
(45) Date of Patent: Dec. 31, 2013

(54) METHOD AND APPARATUS FOR DEVELOPING, IMPROVING AND VERIFYING VIRTUAL METROLOGY MODELS IN A MANUFACTURING SYSTEM

(75) Inventor: James Moyne, Canton, MI (US)

(73) Assignee: Applied Materials, Inc., Santa Clara, CA (US)

( * ) Notice: Subject to any disclaimer, the term of this patent is extended or adjusted under 35 U.S.C. 154(b) by 393 days.

(21) Appl. No.: 13/016,910

(22) Filed: Jan. 28, 2011

(65) Prior Publication Data

US 2011/0190917 A1 Aug. 4, 2011

Related U.S. Application Data

(60) Provisional application No. 61/299,600, filed on Jan. 29, 2010.

(51) Int. Cl.
*G06F 19/00* (2011.01)

(52) U.S. Cl.
USPC ............ 700/109; 700/103; 700/110; 700/121

(58) Field of Classification Search
USPC ................................ 700/103, 109, 110, 121
See application file for complete search history.

(56) References Cited

U.S. PATENT DOCUMENTS 8,095,484 B2 * 1/2012 Cheng et al. .................... 706/14
8,145,337 B2 * 3/2012 Lin et al. ....................... 700/108
2008/0091724 A1 * 4/2008 Qiu et al. ................... 707/104.1
2008/0275586 A1 * 11/2008 Ko et al. ........................ 700/110
2009/0292386 A1 * 11/2009 Cheng et al. .................. 700/109
2010/0312374 A1 * 12/2010 Tsai et al. ...................... 700/110
2011/0009998 A1 * 1/2011 Wang et al. ................... 700/110
2011/0060441 A1 * 3/2011 Ko et al. ........................ 700/101

OTHER PUBLICATIONS

"Moving into the Predictive Space with Virtual Metrology", Nanochip Fab Solutions, vol. 5, Issue 2, 2010.*
Khan, Aftab A., et al., "On the Quality of Virtual metrology Data for Use in the Feedback Process Control," Sep. 2007, AEC/APC Symposium XIX, Indian Wells, CA.
Moyne, "A Blueprint for Enterprise-wide Deployment of Advanced Process Control" Jul. 2009, Solid State Technology, vol. 52, No. 7.

(Continued)

*Primary Examiner* — Michael D Masinick
(74) *Attorney, Agent, or Firm* — Blakely, Sokoloff, Taylor & Zafman LLP

(57) ABSTRACT

A computing device develops a first non-adaptive virtual metrology (VM) model for a manufacturing process based on performing a non-adaptive regression using a first data set. Upon determining that an accuracy of the first non-adaptive VM model satisfies a first quality criterion, the computing device develops an adaptive VM model for the manufacturing process based on performing an adaptive regression using at least one of the first data set or a second data set. The computing device evaluates an accuracy of the adaptive VM model using a third data set that is larger than the first data set and the second data set. The computing device determines that the adaptive VM model is ready for use in production upon determining that an accuracy of the first adaptive VM model satisfies a second quality criterion that is more stringent than the first quality criterion.

20 Claims, 9 Drawing Sheets

(56) References Cited

OTHER PUBLICATIONS

Moyne, J., et al., "Yield Management Enhanced Advanced Process Control System (YMeAPC): Part I, Description and Case Study of Feedback for Optimized Multi-process Control" May 2010, IEEE Transactions on Semiconductor Manufacturing, Special Issue on Advanced Process Control, vol. 23, No. 2.

Olson, K., et al., "Adaptive Virtual Metrology Applied to a CVD Process" Jul. 2010, Proceedings of the 21st Annual SEMI/IEEE Advanced Semiconductor Manufacturing Conference (ASMC), San Francisco.

Ruegsegger, S., et al., Feedforward control for reduced run-to-run variation in microelectronics manufacturing, 1999, IEEE Transactions on Semiconductor Manufacturing 12 (4).

Khan, Aftab A., et al., "Factory-Wide Control utilizing Virtual Metrology" 2007, IEEE Transactions on Semiconductor Manufacturing: Special Issue on Advanced Process Control, 12 pages.

Khan, Aftab A., "Virtual metrology and feedback control for semiconductor manufacturing processes using recursive partial least squares," 2008, Journal of Process Control, 14 pages.

Olson, K., et al., "A process for Developing Practical Adaptive Virtual metrology Models, and Application to a CVD Process" Apr. 28-30, 2010, 10th European Advanced Equipment Control/Advanced Process Control (AEC/APC) Conference, Catania, Italy.

Han, K.P., et al., "Implementation of Virtual Metrology by Selection of Optimal Adaptation Method" Sep. 27-30, 2009, AEC/APC Symposium XX, Ann Arbor, Michigan, U.S.A., 34 pages.

Moyne, James, et al., "Run-to-Run Control in Semiconductor Manufacturing" Chapter 3, CRC Press, Dec. 12, 2010, 20 pages.

Moyne, James, "Utilizing Run-to-Run Control to Improve Process Capability and Reduce Waste in Lithography: Case Studies in Semiconductor and Display Manufacturing, and a Vision for the Future", Proc. of SPIE, Feb. 21, 2010, 9 pages.

Kourti, Theodora, "Application of Latent Variable Methods to Process Control and Multivariate Statistical Process Control in Industry", International Journal of Adaptive Control and Signal Processing, Jan. 27, 2005, 34 pages.

* cited by examiner

METHOD AND APPARATUS FOR DEVELOPING, IMPROVING AND VERIFYING VIRTUAL METROLOGY MODELS IN A MANUFACTURING SYSTEM

RELATED APPLICATIONS

This patent application claims the benefit under 35 U.S.C. §119(e) of U.S. provisional application No. 61/299,600, filed Jan. 29, 2010, which is herein incorporated by reference.

TECHNICAL FIELD

Embodiments of the present invention relate virtual metrology, and more specifically to developing and validating VM models in a cost effective manner.

BACKGROUND OF THE INVENTION

The high cost of metrology, lack of consistent wafer-to-wafer or shot-to-shot (microlithography) metrology, and delays in metrology data feedback often results in unnecessary cost and waste, and lost productivity in semiconductor manufacturing due to factors such as non-optimal or low granularity process control and lack of optimized metrology strategies. Virtual metrology (VM) offers promise to address these problems as it is a less costly software solution, provides information with much less delay, and can be augmented and adjusted by actual metrology data as available. VM is a modeling and metrology prediction solution whereby equipment and process data, such as in-situ fault detection (FD) information, is related to post-process metrology data so that this same equipment and process data can be used to predict metrology information when actual metrology information is not available. However, conventional techniques for generating VM models are expensive. Additionally, typically considerable resources are spent in VM model development and integration before it can be determined whether a VM model will work properly.

BRIEF DESCRIPTION OF THE DRAWINGS

The present invention is illustrated by way of example, and not by way of limitation, in the figures of the accompanying drawings and in which.

DETAILED DESCRIPTION OF THE INVENTION

Figure 1:
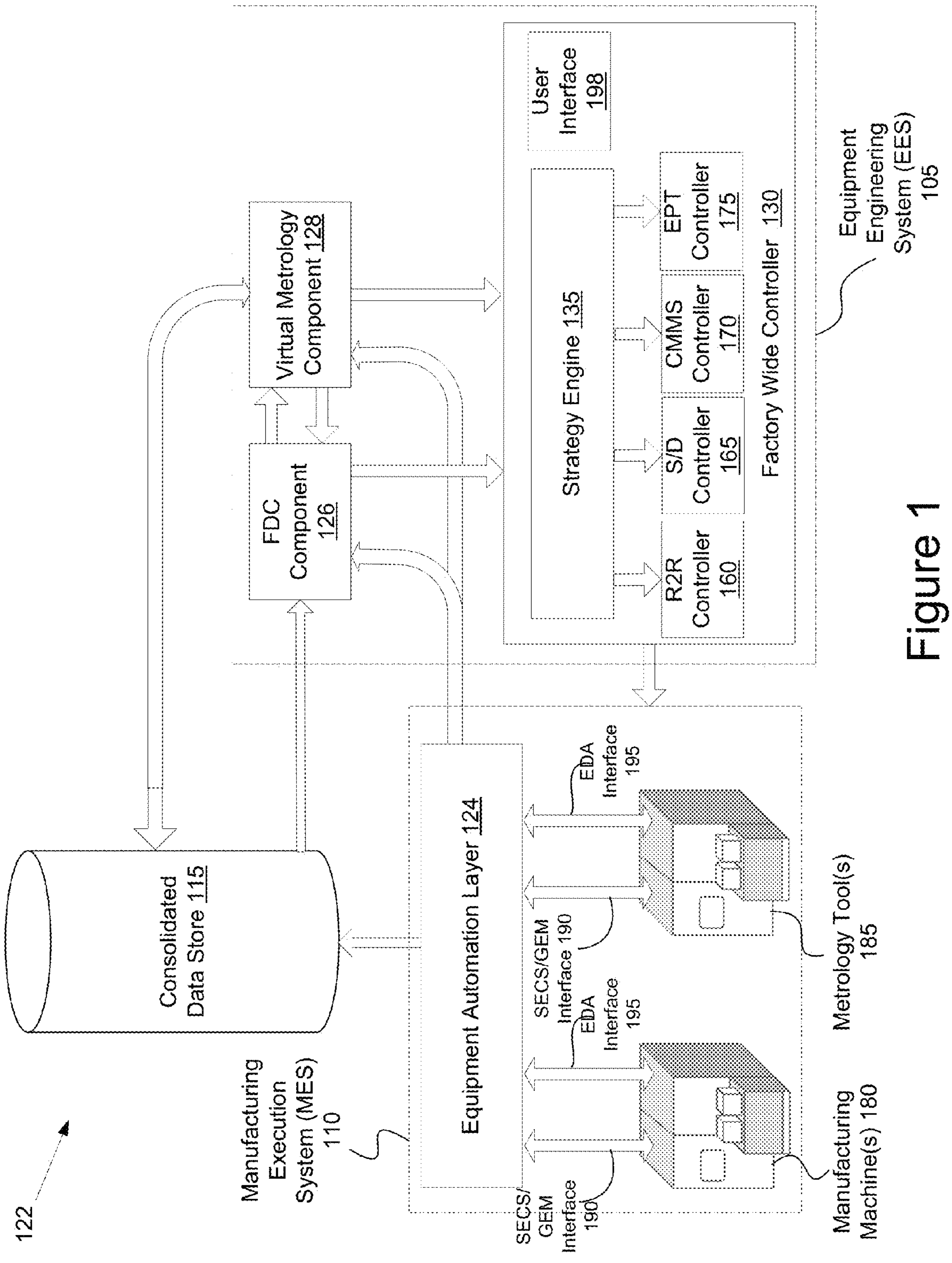
FIG. 1 illustrates an exemplary architecture of a manufacturing environment, in which embodiments of the present invention may operate.

Described herein is a method and apparatus for developing, improving and verifying virtual metrology (VM) models. In one embodiment, a computing device performs a multi-phase development process for developing a VM model. In a first phase of model development, the computing device develops a non-adaptive virtual metrology (VM) model for a manufacturing process based on performing regression using a first set of data. Upon determining that an accuracy of the non-adaptive VM model satisfies a first quality criterion, the computing device proceeds to a second phase of model development. In the second phase, the computing device develops an adaptive VM model for the manufacturing process based on performing regression using at least one of the first data set or a second data set. The computing device then proceeds to a third phase of model development when certain criteria are satisfied. In the third phase, the computing device evaluates an accuracy of the adaptive VM model using a third set of data that is usually larger than the first set of data and the second set of data, and is representative of the current environment of operation for the VM model. The computing device determines that the adaptive VM model is ready for use in production if an accuracy of the first adaptive VM model satisfies a second quality criterion. The second quality criterion is more stringent than the first quality criterion.

By dividing the development of a VM model into multiple phases, and applying different criteria for completing each phase, the costs associated with VM model development may be minimized. For example, if a non-adaptive VM model that meets the first quality criterion cannot be generated for a process, then no further VM development may be performed for that process. In conventional systems, it may not be discovered that a VM model is not feasible for this process until much more money has been spent, and after much more complicated VM models have been generated. Additionally each phase is iterative in that a phase can be re-entered if the quality criteria for successfully exiting that phase or a future phase is not met. For example if the exit quality criteria for phase two is not met, that phase may be repeated or the system may fall back and repeat phase one.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. Unless specifically stated otherwise, as apparent from the following discussion, it is appreciated that throughout the description, discussions utilizing terms such as “developing”, “determining”, “evaluating”, “adjusting”, “comparing”, or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

FIG. 1 illustrates an exemplary architecture of a manufacturing environment 122, in which embodiments of the present invention may operate. The manufacturing environment 122 may be a semiconductor manufacturing environment, an automotive manufacturing environment, or other manufacturing environment. In one embodiment, the manufacturing environment 122 includes an equipment engineering system (EES) 105, a manufacturing execution system (MES) 110 and a data store 115. The EES 105, MES 110 and data store 115 may be connected via a network (not shown), such as a public network (e.g., Internet), a private network (e.g., Ethernet or a local area Network (LAN)), or a combination thereof.

The manufacturing execution system (MES) 110 is a system that can be used to measure and control production activities in a manufacturing environment. The MES 110 may control some production activities (e.g., critical production activities) or all production activities of a set of manufacturing equipment (e.g., all photolithography equipment in a semiconductor fabrication facility), of a manufacturing facility (e.g., an automobile production plant), of an entire company, etc. The MES 110 may include manual and computerized off-line and/or on-line transaction processing systems. Such systems may include manufacturing machines 180 (e.g., implanters, thermal reactors, etchers, lithography machines, etc.), metrology tools 185 (e.g., ellipsometers, interferometers, scanning electron microscopes (SEMs)), client computing devices, server computing devices, databases, etc. that may perform functions related to processing. In one embodiment, the metrology tools 185, manufacturing machines 180 and additional devices of the MES 110 are linked to an equipment automation layer 124 via one or more interfaces (e.g., via a semiconductor equipment communications standards (SECS) interface, a generic model for communications and control of manufacturing equipment (GEM) interface, a SECS/GEM interface 190, an EDA ("Interface A") interface 195, etc.). The equipment automation layer 124 interconnects the manufacturing machines 180, metrology tools 185 and other devices, and links them to the data store 115 and the EES 205.

In one embodiment, the MES 110 is connected with a data store 115. The data store 115 may include databases, file systems, or other arrangements of data on nonvolatile memory (e.g., hard disk drives, tape drives, optical drives, etc.), volatile memory (e.g., random access memory (RAM)), or combination thereof. In one embodiment, the data store 115 includes data from multiple data stores (e.g., a maintenance data store, a metrology data store, process data stores, etc.) that are interconnected. The data store 115 may store, for example, historical process information of manufacturing recipes (e.g., temperatures, pressures, chemicals used, process times, etc.), equipment maintenance histories, inventories, etc. The data store 115 may also store data generated by the MES 110 and/or EES 105. For example, the EES 105 may store fault detection and characterization data in the data store 115 and the MES 110 may store historical process information in the data store 115. This permits each of the EES 105 and MES 110 to leverage data generated by the other systems.

The EES 105 is a system that manages some or all operations of a factory. The EES 105 may include manual and computerized off-line and/or on-line transaction processing systems that may include client computing devices, server computing devices, databases, etc. that may perform the functions of equipment tracking, dispatching (e.g., determining what material goes to what processes), product genealogy, labor tracking (e.g., personnel scheduling), inventory management, costing, electronic signature capture, defect and resolution monitoring, key performance indicator monitoring and alarming, maintenance scheduling, and so on.

The EES 105 draws inferences from, reports out, and/or acts upon the combined information that is collected and stored in the data store 115 and/or the metrology data and process data that is reported by the MES 110. For example, EES 105 can act as an early warning system (e.g., predict scrap, initiate product rework, etc.), provide bottleneck analysis, provide asset management (e.g., reduce unscheduled equipment downtime), improve lean practices, etc. The EES 105 can be used to gain an understanding of the manufacturing environment 100, and can enable a user to determine an efficiency of the manufacturing environment 100 and/or how to improve all or components of the manufacturing environment 100. In one embodiment, the EES 105 includes components that enable the EES 105 to detect faults, classify faults, and predict yield.

In one embodiment, EES 105 includes a fault detection and classification component (FDC) 126, a virtual metrology component 128 and a factory-wide controller 130. FDC component 126 can receive data in real time from the equipment automation layer 124 as the data is collected and/or from the data store 115. The data may include process data that has been gathered by the manufacturing machines during a process run and/or metrology data that was gathered after a process run. Each manufacturing process that is performed on a manufacturing machine 180 is characterized by various physical conditions and properties measured by sensors of the manufacturing machine 180, and by various operating parameters, collectively referred to as process data. Each distinct physical condition or property measured by sensors, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). After a product is processed in a manufacturing machine 180, the product may be analyzed by a metrology device 185 to measure one or more properties of the product. Measurements produced by such analysis are referred to herein as metrology data. Examples of metrology data include thickness measurements (e.g., a measured by an ellipsometer), particle count measurements (e.g., as measured by a scanning electron microscope (SEM)), wafer curvature measurements (e.g., as measured by an interferometer), etc.

The FDC component 126 may use statistical process monitoring (a means of performing statistical analysis on process data and metrology data), genetic algorithms, neural networks, etc. to detect and/or diagnose faults. A fault can be a malfunction or maladjustment of manufacturing machines 180 (e.g., deviation of a machine's operating parameters from intended values), an indication of a need for preventive maintenance to prevent an imminent malfunction or maladjustment, or an indication of an event of condition of interest. A fault is detected when one or more of the statistics of recent process data and/or metrology data deviate from a statistical model by an amount great enough to cause a model metric to exceed a respective confidence threshold or other defined value. A model metric is a scalar number whose value represents a magnitude of deviation between the statistical characteristics of process/metrology data and the statistical characteristics predicted by the model.

Once a fault has been detected, the FDC component 126 provides a mechanism to classify the fault. In one embodiment, the FDC component 126 compares the fault to a collection of fault signatures. Each fault signature represents process conditions representative of a specific fault or faults. When there is a high degree of similarity between one of the fault signatures and the current fault, a match is reported, and the fault is classified. Alternatively, the FDC component 126 may use statistical summary techniques that are then matched to the values for previous occurrences of faults to find a fault that is the closest.

Manufacturing processes are subject to disturbances and drift. Wafer to wafer control (W2W) control and run to run (R2R) control of drifting processes requires inline metrology. However, the use of inline metrology adds the cost of a metrology station, increases cycle time and decreases throughput. Virtual metrology can be used to implement W2W control and R2R control with reduced inline metrology.

Accordingly, in one embodiment, the FDC component 126 is connected to a virtual metrology component 128 that uses virtual metrology (VM) models to predict metrology data based on other metrology data and/or process data. Virtual metrology is a prediction of metrology variables using information about the state of the process for every wafer. Virtual metrology uses fault detection data and upstream metrology information for the prediction. The virtual metrology component 128 receives fault detection/classification data (including information pertaining to a detected fault such as contributions to the fault, an identification/classification of the fault, etc.) from FDC component 126. The virtual metrology component 128 may also receive upstream metrology data (e.g., metrology data generated from previous processing) from the equipment automation layer 124 and/or from the data store 115. The virtual metrology component 128 uses the fault detection/classification data and/or the upstream metrology data as input to a VM model, and produces predictions of metrology data values as output of the VM model. The virtual metrology component 128 may send the virtual metrology data back to FDC component 126, and FDC component can use the virtual metrology data 128 to determine whether any faults have occurred. The VM component 128 may also send the VM data to factory wide controller 130. These predictions can be used by a run to run controller 160 to modify recipe parameters for a process, by a CMMS controller 170 to schedule maintenance of a manufacturing machine, and so on. In one embodiment, the FDC component 126 and the virtual metrology component 128 are combined into a single component. In one embodiment, the virtual metrology component 128 includes modules for generating, updating and/or evaluating virtual metrology models, as discussed in greater detail with reference to FIG. 3.

Figure 2:
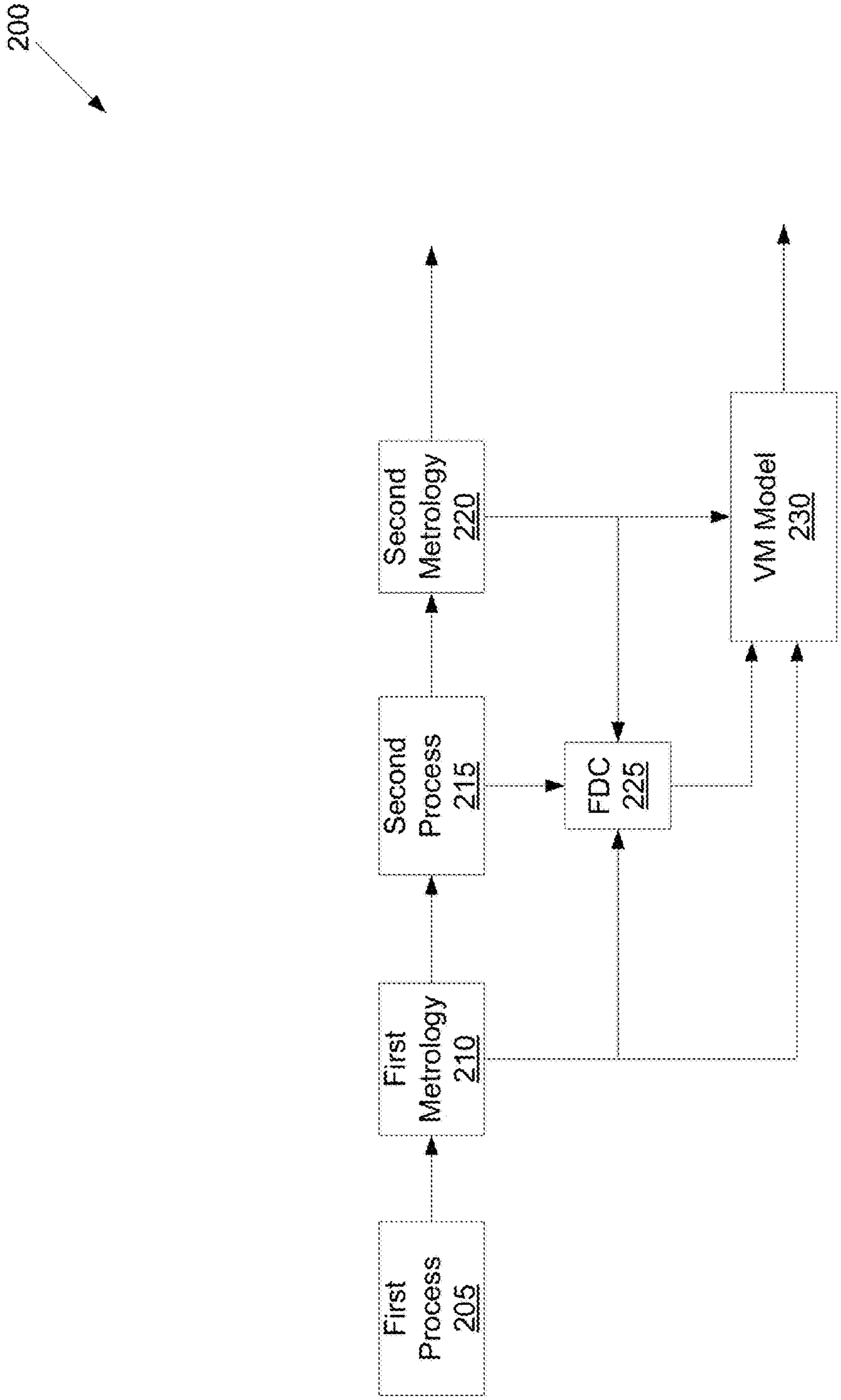
FIG. 2 illustrates an example virtual metrology implementation, in accordance with one embodiment of the present invention.

FIG. 2 illustrates an example virtual metrology implementation 200, in accordance with one embodiment of the present invention. As shown, product is processed in a first process step 205, after which some portion of the product may be measured in a first metrology step 210. The product is then processed in a second process step 215, after which some portion of the product may be measured in a second metrology step 220. Measurements generated during the first metrology step 210 (referred to as pre-process metrology data), during the second process step 215 (referred to as processing data or trace data) and/or during the second metrology step 220 (referred to as post-process metrology data) are sent to a fault detection and control (FDC) component 225, which generates fault detection data from the input measurements. The FDC component 225 provides the fault detection data to a virtual metrology model 230. Additionally, the pre-process metrology data and/or post-process metrology data may also be provided to the VM model 230. The VM model 230 uses these inputs to predict metrology data values.

Returning to FIG. 1, the factory-wide controller 130 receives fault detection and fault classification data from the FDC component 126 and/or virtual metrology data from the virtual metrology component 128. The factory-wide controller 130 is responsible for initiating actions that modify components of the manufacturing environment 100 based on the received fault detection/classification data and/or virtual metrology data. Through such actions, the factory-wide controller 130 can improve both product productivity and quality in an automated fashion. In one embodiment, these actions are in the form of intelligent business rules that can be launched either through real-time system events, predicted events, or scheduled activities. For example, factory-wide controller 130 may automatically schedule maintenance for a manufacturing machine 180, automatically shut down the manufacturing machine 180, automatically adjust a process recipe, etc. when certain values are detected in the received data and/or in the virtual metrology data. In another example, the virtual metrology data can be utilized as feedback information to augment a run to run (R2R) control capability, to augment a maintenance management system and/or to automatically reschedule manufacturing machines that will process product. The actions may also optimize maintenance schedules, scheduling and dispatch decisions, process control, etc.

The factory-wide controller 130 may include a flexible and scalable capability for integrating multiple different EES subsystems, and a mechanism for governing the collaborative utilization of these subsystems to achieve factory-wide directives. In one embodiment, the factory-wide controller 130 includes a strategy engine 135 that is connected to multiple different controllers, each of which controls a different subsystem of the EES 105. For example, a run to run (R2R) controller 160 controls a R2R system, a schedule and dispatch (S/D) controller 165 controls a scheduling and dispatch system, a computerized maintenance management system (CMMS) controller 170 controls a CMMS, an equipment performance tracking (EPT) controller 175 controls an EPT system, etc. In one embodiment, the strategy engine 135 acts as a supervisory system for the controllers. The capabilities of each EES subsystem can be used cooperatively to achieve an optimal reconfiguration of the factory to support yield objectives.

When predetermined events occur and predetermined conditions are satisfied, the strategy engine 135 performs one or a set of actions. These actions may occur simultaneously or in series. When certain actions are completed, feedback that results from the actions may be sent to the strategy engine 135, and subsequent actions may be performed based on the feedback. In one embodiment, the strategy engine 135 performs an action by sending a command and/or information to a controller of a subsystem of the EES 105. The nature of the command and the type of information accompanying the command may depend on the controller to which the command and/or information is sent. For example, an identification of a manufacturing machine 180 that caused a fault, a suggestion of probable causes of problems on the manufacturing machine 180, and instructions to schedule maintenance on the manufacturing machine 180 may be sent to the CMMS controller 170. At the same time, a performance metric that associates the manufacturing machine 180 to a fault may be sent to the S/D controller 165, in response to which the S/D controller 265 can recalculate a cost/benefit analysis of processing product on the manufacturing machine 180 before the maintenance is performed. Other data and/or commands may also be sent to the R2R controller 160 to modify process recipes run on the manufacturing machine 180, to the EPT controller 175 to adjust an equipment performance tracking rating for the manufacturing machine 180, etc.

The run to run (R2R) controller 160 performs R2R control, which is defined as a technique of modifying recipe parameters or the selection of control parameters between process runs to improve processing performance. A 'run' can be a manufacturing process of a batch, lot, an individual wafer, or a component of a wafer such as a die. The R2R controller 160 can control any set of parameters that are relevant to the quality of the product being produced. Thus, parameters specific to a particular process such as CMP final thickness and final thickness uniformity, and more global parameters such as CD, CD uniformity, electrical characteristics, throughput, and yield may all be controlled by the R2R controller 160.

The R2R controller 160 utilizes dynamic models of the system, process and/or machine it is controlling to determine what parameters should be modified and how they should be modified. A R2R control model can be written in the form:

$$(Y_1, Y_2, \ldots, Y_i, \ldots, Y_m) = f(X_1, X_2, \ldots, X_j, \ldots, X_n) \quad (1)$$

where each $Y_i$ represents a quality variable output being controlled and each $X_j$ represents a quality variable input that can be tuned to provide that control.

In one embodiment, the R2R controller 160 uses virtual metrology data generated by VM component 128 to determine what process parameters to modify. Note that, as with any prediction system, the quality of the virtual metrology prediction is important. In one embodiment, the R2R controller 160 takes virtual metrology prediction quality into account, and adjusts a weighting for control of the virtual metrology parameters accordingly.

The CMMS controller 170 maintains maintenance schedules and maintenance histories, current statuses of manufacturing machines and metrology tools, and information on any additional maintenance operations within the manufacturing environment 122. The S/D controller 165 uses information on production orders from ERP systems (cost, quantity, etc.), product process flow requirements, tool availability, product yield associated with manufacturing machines and/or product, and throughput requirements to determine scheduling and dispatch for each of the manufacturing machines 180 in the manufacturing environment 122. The EPT subsystem enables the EES to track basic equipment performance automatically without operator or host input.

Figure 3:
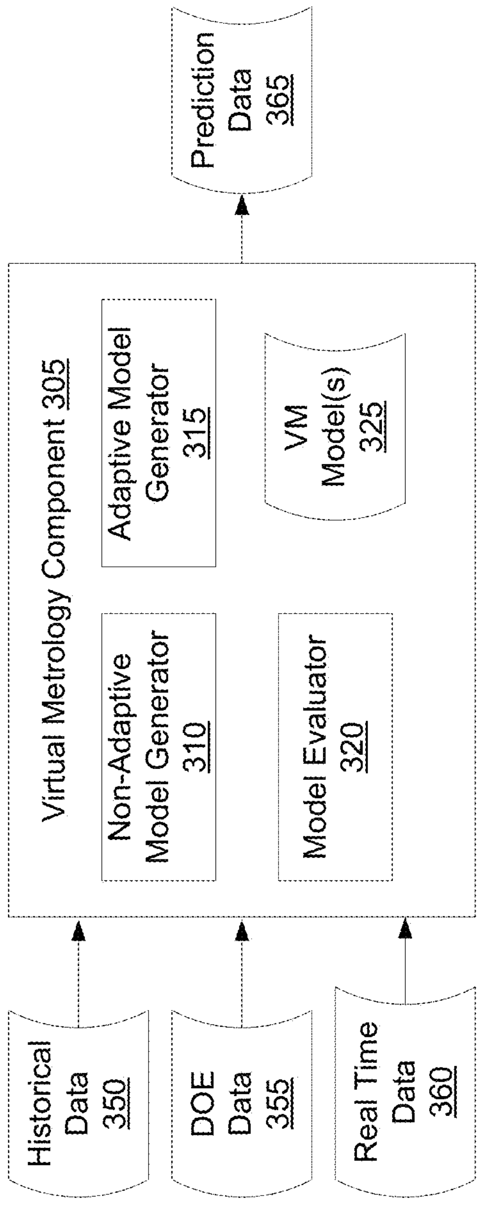
FIG. 3 illustrates a virtual metrology (VM) component, in accordance with one embodiment of the present invention.

FIG. 3 illustrates a virtual metrology (VM) component 305, in accordance with one embodiment of the present invention. In one embodiment, VM component 305 corresponds to VM component 128 of FIG. 1. Alternatively, VM component 305 may not be part of a manufacturing environment. For example, VM component 305 may develop VM models 325, but may not use those VM models 325. Instead, the VM models 325 may be used by other systems that are components of a manufacturing environment. The virtual metrology component 305 includes one or more virtual metrology (VM) models 325. Each VM model 325 predicts metrology values based on input data. What input data to use in predicting the metrology values and what algorithms to use to predict the metrology values is dependent on the VM models 325. In order for the VM models 325 to be useful, it is important that the VM models 325 be accurate. Accordingly, in one embodiment, VM component 305 includes one or more virtual metrology model generators (such as non-adaptive model generator 310 and adaptive model generator 315) and a model evaluator 320.

In one embodiment, when a VM model is to be developed for a manufacturing process, non-adaptive model generator 310 first generates a non-adaptive VM model for the manufacturing process. Non-adaptive model generator 310 may generate the non-adaptive VM model by performing regression (e.g., by performing a partial least squares analysis) using a first set of data. The first set of data may be input historical data 350 and/or design of experiments (DOE) data. The first set of data may include process variables, process trace data, pre-process metrology data, post-process metrology data and/or fault detection data. In one embodiment, non-adaptive model generator 310 uses a comparatively small amount of input data to generate the non-adaptive VM model. Enough data may be used to be statistically significant, but to also keep model development costs to a minimum.

In one embodiment, to generate the initial non-adaptive VM model, non-adaptive model generator 310 defines $\phi(k)=[u(k),v(k),k]$, where $\phi(k)$ is the vector of VM predictions generated, u is the vector of process inputs, v is the vector of FDC analysis outputs and k is the run number. Non-adaptive VM model generator 310 arranges the data for n process runs (from historical and/or DOE data) into two matrices, $v=[\phi(1)^\tau, \phi(2)^\tau, \ldots \phi(n)^\tau]^\tau$ and $y=[y(1)^\tau, y(2)^\tau, \ldots y(n)^\tau]^\tau$. If non-adaptive model generator 310 lets $Y=Y-\bar{Y}$ and $V=V-\bar{V}$, where $\bar{Y}$ and $\bar{V}$ are the mean values of columns of Y and V respectively, then a linear regression model of the given process can be written as:

$$Y=VB+E \quad (2)$$

where $B \in \mathbb{R}^{(l+p+t)\times q}$ is a matrix of regression coefficients $B=[A\ C\ \delta]^\tau$ and E is an n×q matrix of errors whose elements are independent and initially distributed with mean zero and variance $\sigma^2$.

Different regression methods, such as multiple linear regression (MLR), principal component analysis (PCR) and partial least squares (PLS) can be applied to matrices V and Y to estimate the coefficient matrix in B in equation (2). In the PCR modeling approach, the directions of highest variability are determined for a single data set such as the input space in a VM problem formulation. The PLS modeling approach determines vectors of highest variability in an input space as it relates to variability in an output space. In other words, PLS determines a small number of "components" that relate input space to output space, and thus reduces the dimension of the I/O relationship problem. For PLS, in a system with 'p' inputs (e.g., FD data of interest) and 'q' outputs (e.g., metrology indicators of interest), a relatively small set of 'a' components are utilized to relate variation in the inputs to variation in the outputs. These components can be thought of roughly as the dimensions of variability in the input space that have the most significant impact on dimensions of variability in the output space. Note that, instead of or in addition to FD information, trace data can be utilized to support VM modeling.

Different manufacturing machines may have subtle differences that can affect the accuracy of a generated VM model. Additionally, different processing chambers within a single manufacturing machine may have subtle differences that affect the accuracy of a generated VM model. Accordingly, in one embodiment, a separate VM model is generated for each manufacturing machine and/or chamber due to significant inter-chamber differences and dynamics, rather than developing one overarching model for all chambers and/or devices. However, models may be validated across chambers and/or manufacturing machines by examining the commonality of variable contributors to the VM models.

Developing and, more importantly, maintaining VM models utilizing trace data can be costly in the run-time environment in terms of data management and data analysis time. If good models can be maintained utilizing FD along with select contextual data, the level of practicality of these models is improved. In one embodiment, VM models are maintained with FD and context data (i.e., without the requirement of trace data). It is important to note, however, that additional FD methods may be added to capture specific features within the trace data.

Context data that indicates the beginning and end of the recipe step or steps that are being modeled is very important to the quality of the model. Also of importance is context data that indicates the occurrence of and type of maintenance events, as many maintenance events types contribute to system dynamics such as process drifts and shifts. A VM modeling tool such as one based on Partial Least Squared (PLS), if made aware of these events, can model (rather than adjust to) these dynamics if the dynamics are consistent, or use the knowledge of occurrence to invoke model adaptation.

Once non-adaptive model generator 310 has generated non-adaptive VM models, model evaluator 320 evaluates the non-adaptive VM models. In one embodiment, model evaluator 320 computes a squared correlation coefficient (R-squared) value for the VM models. The R-squared value is a goodness of fit metric that identifies how close predicted data is to actual data. The R-squared value ranges from 0 to 1, with a value of 1 representing a perfect fit. If the R-squared value exceeds a first quality threshold (e.g., 0.5), then the model evaluator 320 determines that a VM model for the process may work.

Another metric that model evaluator 320 may use to determine model quality (another quality criterion) is a model residuals value. After model completion, the residuals are un-modeled variables (variables not used to predict VM values). In general, the larger the residuals, the lower the quality of the model. Accordingly, in one embodiment, if the percentage of the number of the residuals to the total number of variables exceeds a residuals threshold, then the VM model fails to satisfy the quality criteria.

In one embodiment, model evaluator 320 compares VM models for a process that are generated for different chambers and/or manufacturing machines. If the top contributors for predicting VM values fail to match between the different models, the model evaluator 320 may determine that the VM models fail to satisfy a quality criterion.

If the non-adaptive VM models satisfy a first quality criterion (or multiple first quality criteria), then adaptive model generator 315 generates adaptive VM models for the manufacturing process. Adaptive model generator 315 may use PLS, PCA, MLR or other regression techniques to develop the adaptive VM models. Adaptive model generator 315 may use a larger set of input data to generate the adaptive VM models than is used by non-adaptive model generator 310. The input data may include historical data 350, design of experiments (DOE) data 355, or a combination of both.

As systems evolve over time, the relationship between inputs and metrology indicator outputs changes (e.g., due to the build-up of polymers in an etch chamber between cleans). An adaptive VM model that is updated periodically or continuously as new data is gathered can account for such changes. In one embodiment, virtual metrology component 305 compares actual metrology information (when available) with predicted information, and adjusts VM models 325 accordingly. Once new metrology information has been analyzed and classified, for example, virtual metrology component 305 may combine the new metrology information with existing metrology information to generate a new or updated VM model. If a PLS yield prediction model is used, PLS model adjustment techniques such as the nonlinear iterative partial least squares (NIPALS) algorithm can be utilized to modify the VM model. Alternatively, an exponentially weighted moving average (EWMA) algorithm can be utilized to modify the VM model. Given two prediction algorithms EWMA and NIPALS, EWMA is fast and easy, but can be inaccurate when the VM equation changes. The EWMA utilizes zero'th order adaptation of the VM equation. NIPALS is complex, but more accurate. NIPALS reformulates the VM equation.

Figure 4:
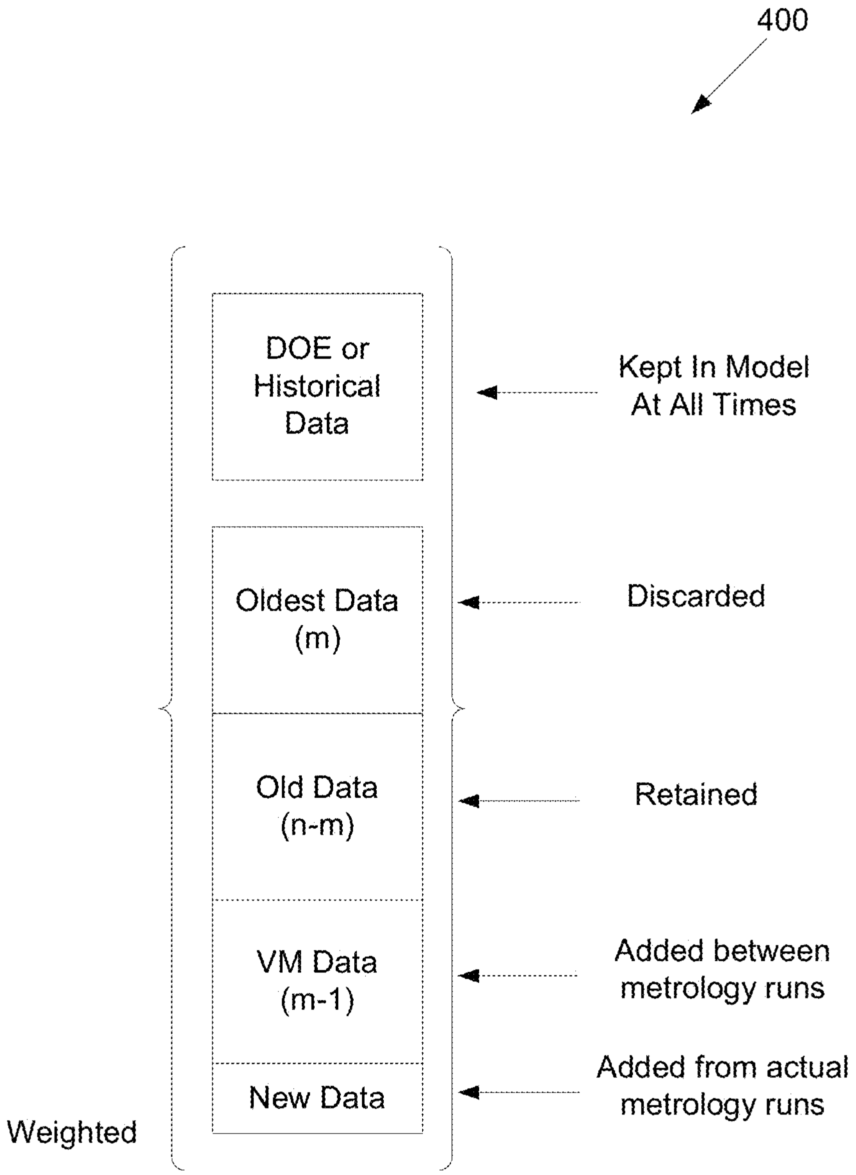
FIG. 4 illustrates a moving window technique for an adaptive VM model, in accordance with one embodiment of the present invention.

In one embodiment, a moving window technique is used to update the VM model. One embodiment of such a moving window technique is shown in FIG. 4. In the moving window technique, DOE data or historical data is initially used to generate a VM model. As new data is received, a portion of the data used in the prediction model is discarded, and a portion of the data used in the prediction model may be retained. In one embodiment, DOE data or a designated portion of historical data is always retained, and only subsequently received data may be discarded. In one embodiment, oldest data (other than DOE data or designated historical data) is discarded. In such an embodiment, a moving window is used, wherein all data that is outside of the moving window is discarded, and all data within the moving window is retained. This allows the VM model to evolve over time. A weighting may be applied to the retained data. The size of the window and the relative weighing of data impact the responsiveness of the model to changing conditions and its ability to reject noise. For example, a smaller window has an increased responsiveness, but is more susceptible to noise. The size of the window is a function of process and prediction noise and aggressiveness of the prediction. The moving window technique may be used with either NIPALS or an EWMA approach to model adaptation.

The predicted VM values output by models generated by adaptive model generator 315 may have varying degrees of accuracy. The confidence (predicted accuracy) of a VM prediction can depend on numerous variables, such as the quality of the data used to make the prediction, whether the prediction is being made for a relatively new product or for a product that has been successfully manufactured numerous times in the past, and so on. Accordingly, in one embodiment, adaptive model generator 315 generates VM models 325 that output a prediction quality metric as well as a prediction.

In one embodiment, the prediction quality metric is defined such that a higher value indicates a higher quality. Alternatively, the prediction quality metric may be defined such that a lower value indicated a higher quality. The availability of a quality for a prediction may be a function of the prediction method and historical data associated with the utilization of that predictor. In one embodiment, prediction quality is determined based on a direct comparison of past predictions with actual metrology data. Thus, a prediction error $e_z$ can be characterized by the equation, $$e_z=y(z_m)-\hat{y}(z_m) \quad (3)$$

where $y(z_m)$ is the measured value and $\hat{y}(z_m)$ is the predicted value. A statistical average of the predication through averaging over several readings can then be computed. In one embodiment, filtering mechanisms such as EWMA are used.

If it is determined that accuracy is a function of factors such as delta from last prediction, first order effects can be modeled into the prediction error as follows, $$e_z=f\{y(z_m)-\hat{y}(z_m),\hat{y}(z_m)-\hat{y}(z_{m-1})\} \quad (4)$$

In another embodiment, a mean square error (MSE) metric may be used to determine the prediction quality. Assume the measured output y and predicted output ŷ are zero-mean with Gaussian deviations from target. A minimum MSE estimate (mmse) of y based on ŷ may then be given by the conditional equation, $$y_{mmse}=E_{pr}[y\mid\hat{y}]\xrightarrow{GRV}y_{mmse}=\rho\frac{\sigma_y}{\sigma_{\hat{y}}} \quad (5)$$

where ρ is the correlation coefficient, $$\rho=\frac{\mathrm{cov}[y,\hat{y}]}{\sigma_y\sigma_{\hat{y}}} \quad (6)$$

and where $E_{pr}$ equals the probabilistic expected value, and $\sigma_y$ and $\sigma_{\hat{y}}$ are standard deviations from y and ŷ, respectively. The best performance may be achieved when a minimum MSE of outputs from target values is achieved.

The prediction quality metric can later be used in conjunction with the prediction to determine what, if any, automated actions to perform by EES subsystems. For example, the prediction quality metric can be used to avoid false positives, and for quantitative use of VM data for applications such as W2W control. This capability also allows appropriate setting of controller gain based on feedback data quality and generally allows VM to be more effective because results can be trusted.

Over time, a VM model library can be developed to shorten the model set discovery and definition time. Such a VM model library can include process specific, process-product specific, equipment specific, equipment-product specific, and equipment model specific categories. The VM model library may be stored in a data store.

Once adaptive model generator 315 generates an adaptive VM model, model evaluator 320 test the adaptive VM model. Model evaluator 320 may perform the same tests as described above with reference to testing of the non-adaptive VM models to test the adaptive VM models. However, the quality criteria may have increased thresholds for testing the adaptive VM models. For example, quality criteria applied to adaptive VM models may include a minimum R-squared value of 0.7 or 0.8 as opposed to a minimum R-squared value of approximately 0.5 for the non-adaptive VM models. Additionally, the quality criteria applied to the adaptive VM models may require a decreased residuals value.

In one embodiment, the quality criteria settings for the adaptive VM models are based on a known use for the VM models. For example, if a VM model will be used just to generate alarms or suggest maintenance, then an R-squared value of 0.7 may be an adequate quality criterion. However, if the adaptive VM model will be used to adjust process recipe parameters or to shut down manufacturing machines, then a higher R-squared value of 0.8 or 0.9 may be required.

Figure 5:
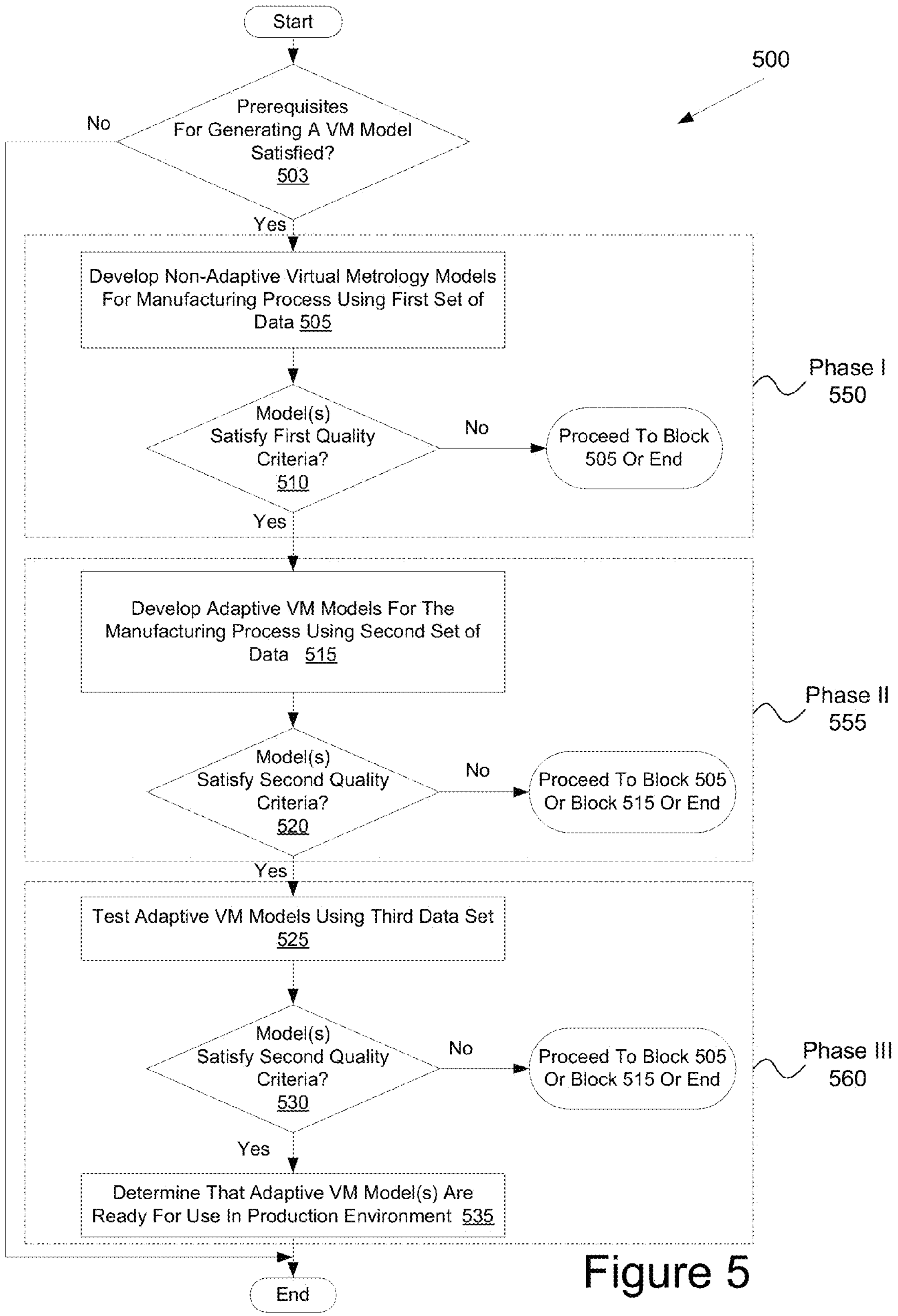
FIG. 5 illustrates a flow diagram of one embodiment for a method of generating, updating and validating a VM model.

FIG. 5 illustrates a flow diagram of one embodiment for a method 500 of generating, updating and validating a VM model. The method may be performed by processing logic that may comprise hardware (e.g., circuitry, dedicated logic, programmable logic, microcode, etc.), software (such as instructions run on a processing device), or a combination thereof.

Method 500 should be considered as an example of a process for virtual metrology development that minimizes development cost in addition to technical issues by ensuring that necessary capabilities exist before proceeding to costly steps in the VM development process. The VM development process of method 500 may be highly iterative, and can be considered as a continuous improvement process with the primary goal being the continuous improvement of VM model quality in areas that relate to its particular application. These applications benefit from the improvement of modeling quality, and may also rely on knowledge of what that quality level is. Thus, the modeling improvement process may also include methods for assessment of modeling quality. In one embodiment, method 500 is performed by VM component 305 of FIG. 3.

Referring to FIG. 5, at block 503 processing logic determines whether one or more prerequisites for generating a VM model and/or for otherwise pursuing a VM modeling project are satisfied. In one embodiment, processing logic determines whether target processes and/or equipment have been identified. If the target processes and/or equipment have been identified, processing logic determines whether a pre and post metrology capability exists for each target equipment. In one embodiment, processing logic determines whether an equipment automation infrastructure with FD data analysis is in place for each target manufacturing machine. If no equipment automation infrastructure and/or no FD analysis is in place, a VM model may not be developed.

In one embodiment, processing logic determines whether a VM integration strategy has been identified, preferably one that is a natural extension to an existing automation fault detection infrastructure. In one embodiment, processing logic determines whether reliable high quality data is available. This may include availability of high quality metrology and fault detection data. This may include data with appropriate contextual information (e.g. wafer id, and step #), as well as data (e.g., historical data and/or DOE data) that has sufficient variability. If one or more of the prerequisites for generating a VM model are not satisfied, the method ends. If all prerequisites are satisfied, the method continues to block 505.

At block 505, processing'logic develops a non-adaptive VM model for a manufacturing process. Processing logic may perform regression such as PCA or PLS using a first set of data to generate the non-adaptive VM models. At block 510, processing logic determines whether the developed models satisfy first quality criteria. The first quality criteria may include a first R-squared threshold, a first residuals threshold and/or a matching principal contributors requirement. If the models fail to satisfy the first quality criteria, the method returns to block 505 or ends. If the models do satisfy the first quality threshold, the method continues to block 515.

Some form of VM model adaptation is needed to track processes that drift. Thus, at block 515, processing logic develops adaptive VM models for the manufacturing process. Processing logic may perform regression with an adaptive technique such as NIPALS or EWMA using the first data set or a second data set to generate the adaptive VM model. The relationship between FD outputs and metrology predictions changes over time. The adaptive VM models account for such changes. One example of an adaptive VM model is based on PLS+EWMA, which adjusts PLS offsets when actual metrology data is available. Such adaptive models work well when drift is slow and predictable. Another example of an adaptive VM model is based on PLS+NIPALS, which performs an incremental reformulation of PLS models. Such adaptive models work well when there is significant change in conditions.

At block 520, processing logic determines whether the adaptive VM models satisfy second quality criteria. The second quality criteria may test the same metrics as the first quality criteria, but may have more stringent requirements (e.g., higher thresholds) for satisfying those criteria. If the VM models fail to satisfy the second quality criteria, the method proceeds to block 505, to block 515, or ends. If the VM models satisfy the second quality criteria, the method continues to block 525.

At block 525, processing logic tests the adaptive VM models using a third data set. In one embodiment, the third data set is larger than the first data set and the second data set. In another embodiment, the third data set represents a more current manufacturing data set (e.g., a data set representative of a current application environment). The current application environment may be the environment in which the VM model will be used once the VM model is approved. In one embodiment, this may include current processing parameters, current tool state, current product, and so forth. At block 530, processing logic determines whether the adaptive VM models still satisfy the second quality criteria. If the adaptive models fail to satisfy the second quality criteria after testing the adaptive VM models, the method proceeds to block 505, proceeds to block 515, or ends. If the adaptive models satisfy the second quality criteria, then the method continues to block 535. At block 535, processing logic determines that the adaptive VM models are ready for use in a production environment. The method then ends.

Method 500 may be logically divided into three separate phases, referred to herein as a data collection phase (phase I 550), a model development phase (phase II 555) and a model validation phase (phase III 560). In one embodiment, blocks 505 and 510 comprise the data collection phase 550, blocks 515 and 520 comprise the model development phase, and blocks 525, 530 and 535 comprise the model validation phase. There may be costs associated with performing each phase in method 500. Accordingly, processing logic may only continue to a next phase if a current phase is successful. Accordingly, costs may be saved if, for example, it is unfeasible to generate a VM model for a particular process.

Figure 6:
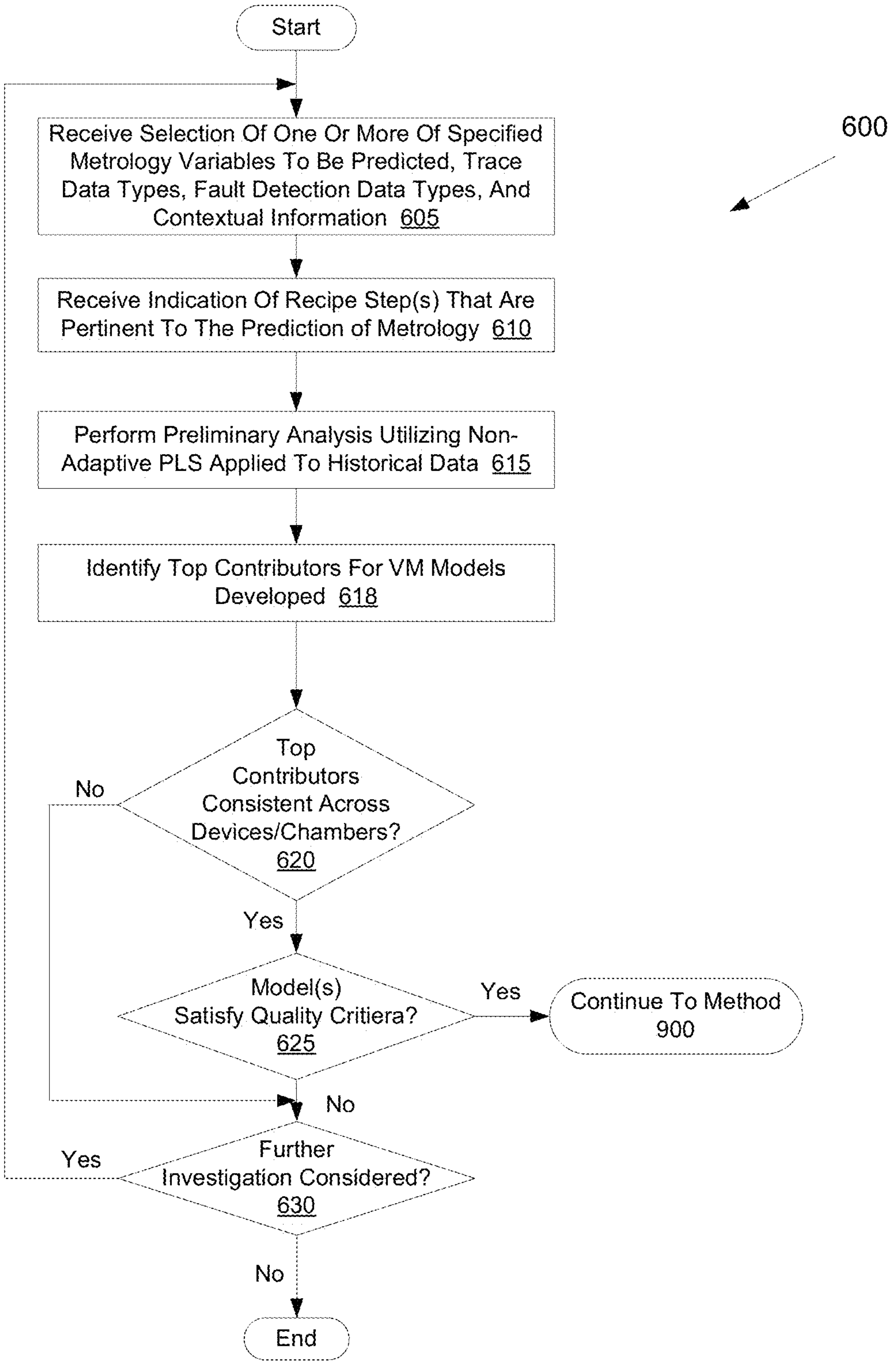
FIG. 6 illustrates a flow diagram of one embodiment for a method of developing a non-adaptive VM model.

FIG. 6 illustrates a flow diagram of one embodiment for a method 600 of developing a non-adaptive VM model. The method may be performed by processing logic that may comprise hardware (e.g., circuitry, dedicated logic, programmable logic, microcode, etc.), software (such as instructions run on a processing device), or a combination thereof. In one embodiment, method 600 is performed by VM component 305 of FIG. 3. In one embodiment, method 600 corresponds to phase I 550 of method 500.

At block 605, processing logic makes a determination of metrology variables to be predicted, trace data types, FD data types, and definition of any context provided. In one embodiment, selection of one or more of the metrology variables to be predicted, trace data types, FD data types, or context definition are received from a user.

At block 610, processing logic determines one or more recipe steps that are pertinent to the prediction of metrology for a given process. In one embodiment, the one or more recipe steps are determined based on preliminary data analysis. In one embodiment, the one or more recipe steps are determined based on user input.

At block 615, processing logic performs a first preliminary analysis utilizing non-adaptive PLS applied to historical data and/or DOE data to determine whether some reasonable model quality can be achieved. Alternatively, other regression techniques may be performed. Multiple chambers and/or manufacturing machines for the same process may be analyzed separately. At block 618, processing logic identifies top contributors for the test models developed. The top contributors should be reasonably similar among chambers, though the order does not have to be exactly the same. Process and equipment experts may be consulted to verify that top contributors identified are reasonable.

At block 620, processing logic determines whether the top contributors are consistent across devices and/or chambers. If the top contributors are not consistent across chambers and/or devices, the method continues to block 630. If the top contributors are consistent across chambers and/or devices, or if only one chamber is being analyzed, the method continues to block 625.

At block 625, processing logic determines whether the VM models satisfy one or more quality criteria (e.g., a quality threshold). The output of block 625 is a decision as to whether or not it is reasonable to expect that VM models can be developed, and an indication of the data and context types that will be used to realize the models. If no reasonable model can be discerned, then the original premise of selection of recipe step(s) should be revisited and questioned, and the selection of data parameters for collection and associated FD methods should be examined. If no improvements can be made then it is reasonable to conclude that the process system, in its current state, is not a good candidate for VM. If the models satisfy the quality criteria, method 700 is started. Otherwise, the method continues to block 630.

At block 630, processing logic determines whether further investigation is considered. In one embodiment, processing logic prompts a user to indicate whether to perform further investigation into generating a VM model. If further investigating is considered, the method returns to block 605. Otherwise, the method ends.

Figure 7:
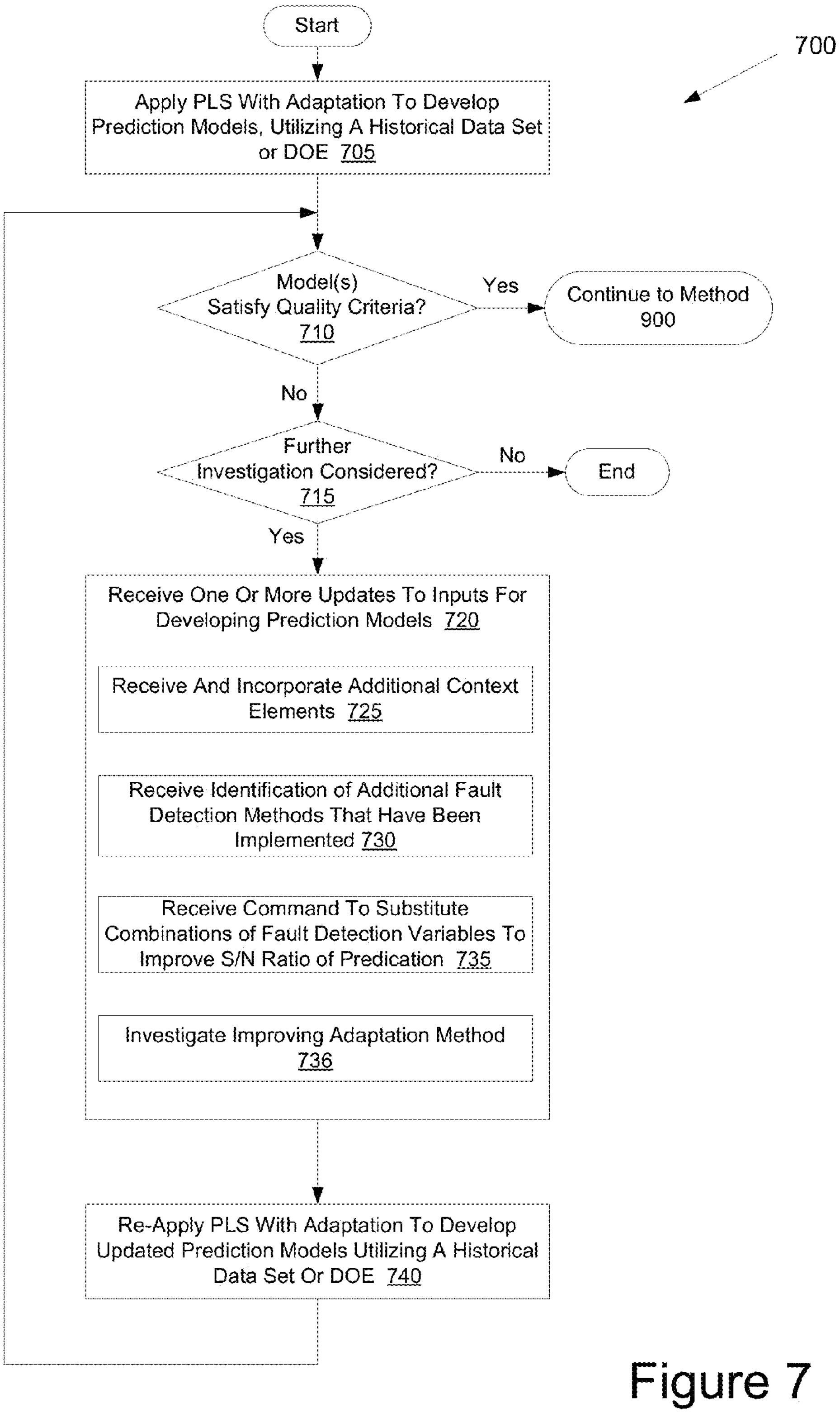
FIG. 7 illustrates a flow diagram of one embodiment for a method of developing an adaptive VM model.

FIG. 7 illustrates a flow diagram of one embodiment for a method 700 of developing an adaptive VM model. The method may be performed by processing logic that may comprise hardware (e.g., circuitry, dedicated logic, programmable logic, microcode, etc.), software (such as instructions run on a processing device), or a combination thereof. In one embodiment, method 700 is performed by VM component 305 of FIG. 3. In one embodiment, method 700 corresponds to phase II 555 of method 500.

At block 705, processing logic applies PLS with adaptation to develop and evaluate prediction models, utilizing a historical data set provided or a provided DOE data set. In one embodiment, a portion of historical data is used to develop the models with the remainder used to assess model quality. Models using EWMA and models using NIPALS adaptation may be evaluated.

At block 710, processing logic determines whether the generated models satisfy a quality criteria. The quality of these models can be assessed through examination of R-squared values or residuals. Determination of what is "acceptable" at this stage is subjective, however R-squared values under 0.7 should be a source of concern. If the models satisfy quality criteria, method 800 is started. The output of method 700 is a set of adaptive predication models for verification. If the models fail to satisfy quality criteria, the method continues to block 715.

At block 715, processing logic determines whether further investigation is considered. If further investigation is considered, the method continues to block 720. Otherwise, the method ends.

At block 720, processing logic receives one or more updates to inputs used for developing the prediction models. In one embodiment, at block 725 processing logic receives and incorporates one or more additional context elements. Depending on the disturbance associated with the context, the context can either be used to model the associated disturbance or trigger the adaptive component of the model. For example, if the disturbance is a maintenance event, and the impact of the disturbance is very predictable, then a variable such as "number of runs since last disturbance" can be added to the model. However if the impact of the maintenance event is a significant process shift, but unpredictable, the event could be used to trigger EWMA adaptation.

At block 730, processing logic receives an identification of one or more additional fault detection methods that have been implemented. An engineer may revisit the trace data to see if any trace features not captured by the current FD methods relate to metrology excursions. If candidate trace data patterns were detected and if these patterns relate to normal processing (e.g., are not associated with a downtime event), then the engineer may have developed and added an appropriate FD method to the data collection. Most FD models are means and variances of trace signals. However there may be features in the trace data that seem to be correlated to metrology excursions that are not adequately captured by simple summary statistics. These features should be investigated and, if they are related to normal processing, consideration should be given to developing additional FD models to capture these features (e.g., "golden run" algorithms).

At block 735, processing logic receives a command to substitute combinations of fault detection variables to improve a single to noise (S/N) ratio of prediction. These translated variables could come from suggestions from process or equipment experts, or from detection of persistent relationships between variables, for example across chambers.

At block 736, the method for adapting the VM model could be investigated for improvement. For example the size of the moving window could be altered to better capture the dynamics of the process. The method of adaptation could be changed, for example from EWMA to NIPALS or a combination of NIPALS and EWMA.

At block 740, processing logic reapplies PLS with adaptation (or other regression techniques) to develop updated prediction models utilizing the historical data set and/or the DOE data set. The method then returns to block 710. Blocks 710, 715 and 720 of method 700 may be performed iteratively. Each of these blocks may be revisited until acceptable model performance is reached, or it is determined that acceptable model quality is unobtainable or cost prohibitive.

Figure 8:
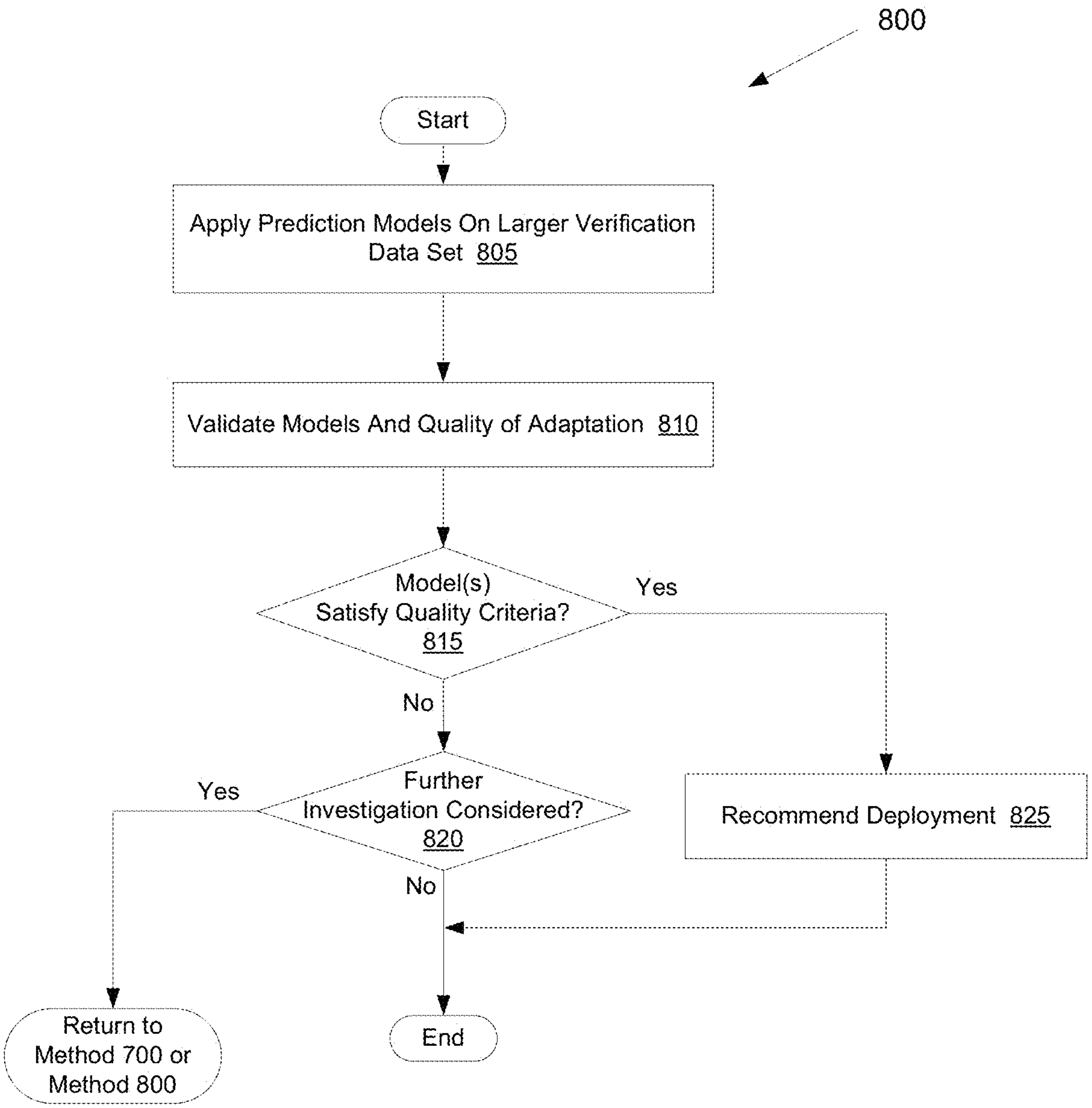
FIG. 8 illustrates a flow diagram of one embodiment for a method of validating an adaptive VM model.

FIG. 8 illustrates a flow diagram of one embodiment for a method 800 of validating an adaptive VM model. The method may be performed by processing logic that may comprise hardware (e.g., circuitry, dedicated logic, programmable logic, microcode, etc.), software (such as instructions run on a processing device), or a combination thereof. In one embodiment, method 800 is performed by VM component 305 of FIG. 3. In one embodiment, method 800 corresponds to phase III 560 of method 500.

At block 805, processing logic applies the adaptive CM models to a larger data set and/or a data set that is representative of the current application environment. In method 800 the focus is on verifying that models have sufficient quality, rather than trying to improve model quality. The adaptive models are exercised on a larger data set so that model fidelity and adaptability can be assessed.

At block 810, processing logic validates the models and quality of the adaptation. Any NIPALs reformulated models should be analyzed to verify that the top contributors remain reasonably constant and consistent with opinions of process and equipment experts.

At block 815, processing logic determines whether the models satisfy a quality threshold. The output of method 800 is an assessment of model validity. As noted earlier, any assessment is dependent on the applications that will consume the VM data and the prediction quality that they require. If the models satisfy the quality criteria, the method continues to block 825, and processing logic recommends deployment of the adaptive VM models. If the models fail to satisfy the quality threshold, the method continues to block 820.

At block 820, processing logic determines whether further investigation is considered. If further investigation is considered, processing logic returns to method 600 or method 700. If further investigating is not considered, the method ends.

Figure 9:
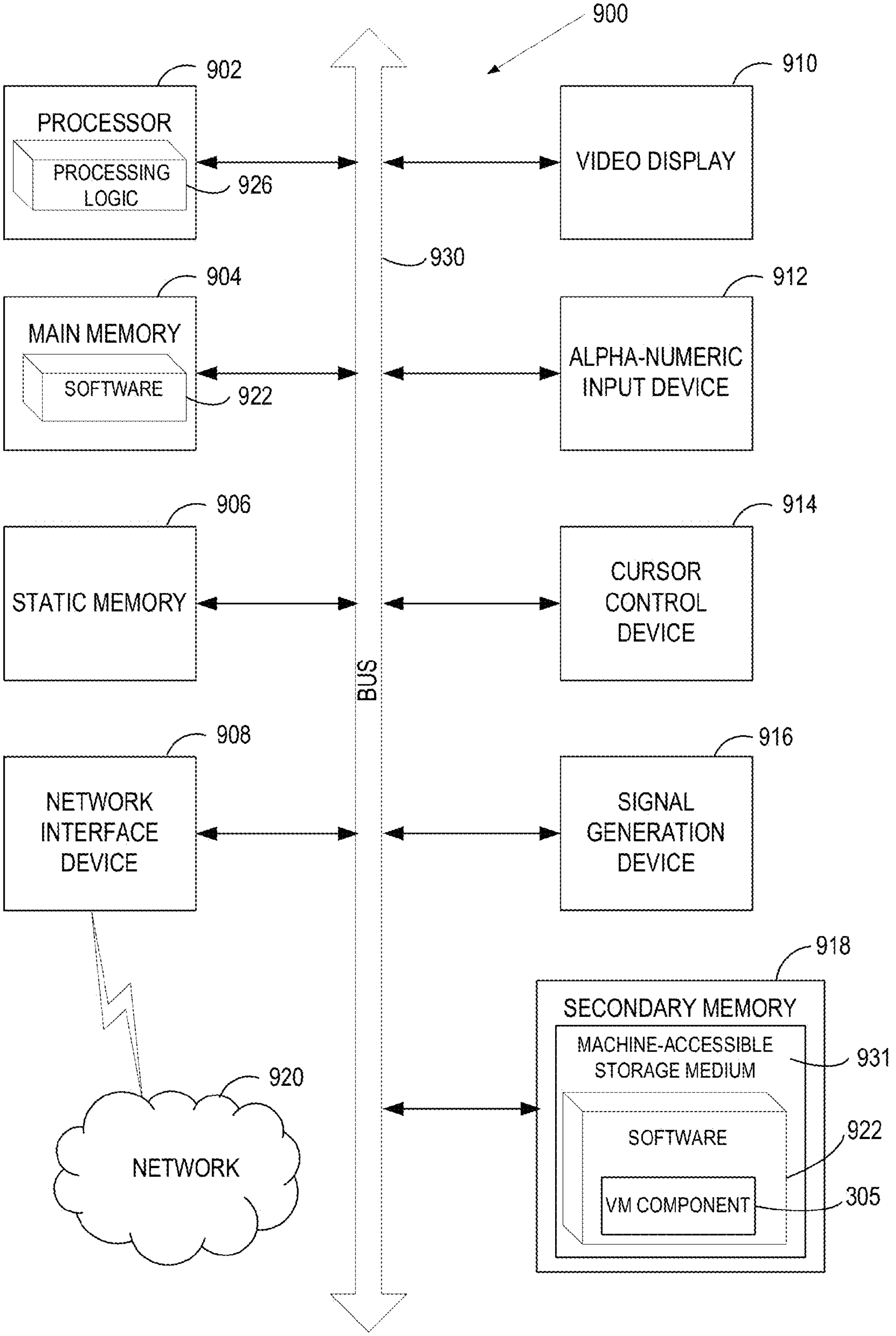
FIG. 9 illustrates a diagrammatic representation of a machine in the exemplary form of a computer system, in accordance with one embodiment of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

The machine-readable storage medium 931 may also be used to store a virtual metrology component (as described with reference to FIG. 3), and/or a software library containing methods that call a virtual metrology component. While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:

developing a first non-adaptive virtual metrology (VM) model for a manufacturing process based on performing a first regression using a first data set;

upon determining that an accuracy of the first non-adaptive VM model satisfies a first quality criterion, developing an adaptive VM model for the manufacturing process based on performing a second regression using at least one of the first data set or a second data set;

evaluating an accuracy of the adaptive VM model using a third data set that is at least one of a) larger than the first data set and the second data set or b) representative of a current application environment; and determining that the adaptive VM model is ready for use in production upon determining that an accuracy of the adaptive VM model satisfies a second quality criterion that is more stringent than the first quality criterion.

2. The method of claim 1, wherein the first regression is non-adaptive partial least squares (PLS) regression, and wherein the second regression is adaptive PLS regression.

3. The method of claim 1, wherein the first non-adaptive VM model is for a first chamber of a first manufacturing machine that performs the manufacturing processes, the method further comprising:

developing a second non-adaptive VM model for a second chamber of the first manufacturing machine or of a second manufacturing machine that performs the manufacturing process based on performing the second regression using a fourth data set; and comparing the first non-adaptive VM model to the second non-adaptive VM model to determine whether the first non-adaptive VM model satisfies the first quality criterion, wherein the first non-adaptive VM model satisfies the first quality criterion if principal contributors for the first non-adaptive VM model match principal contributors for the second non-adaptive VM model.

4. The method of claim 1, wherein the first data set includes historical data, the second data set includes at least one of historical data or design of experiments (DOE) data, and the third data set includes at least one of historical data or real time data.

5. The method of claim 1, wherein the first quality criterion is a squared correlation coefficient (R-squared) threshold of approximately 0.5 and the second quality criterion is a squared correlation coefficient (R-squared) threshold of approximately 0.7.

6. The method of claim 1, wherein the first quality criterion is a first residuals threshold and the second quality criterion is a second residuals threshold that is more stringent than the first residuals threshold.

7. A computer readable storage medium including instructions that, when executed by a processing device, cause the processing device to perform a method comprising:

developing a first non-adaptive virtual metrology (VM) model for a manufacturing process based on performing a first regression using a first data set;

upon determining that an accuracy of the first non-adaptive VM model satisfies a first quality criterion, developing an adaptive VM model for the manufacturing process based on performing a second regression using at least one of the first data set or a second data set;

evaluating an accuracy of the adaptive VM model using a third data set that is at least one of a) larger than the first data set and the second data set or b) representative of a current application environment; and determining that the adaptive VM model is ready for use in production upon determining that an accuracy of the adaptive VM model satisfies a second quality criterion that is more stringent than the first quality criterion.

8. The computer readable storage medium of claim 7, wherein the first regression is non-adaptive partial least squares (PLS) regression, and wherein the second regression is adaptive PLS regression.

9. The computer readable storage medium of claim 7, wherein the first non-adaptive VM model is for a first chamber of a first manufacturing machine that performs the manufacturing processes, the method further comprising:

developing a second non-adaptive VM model for a second chamber of the first manufacturing machine or of a second manufacturing machine that performs the manufacturing process based on performing the second regression using a fourth data set; and comparing the first non-adaptive VM model to the second non-adaptive VM model to determine whether the first non-adaptive VM model satisfies the first quality criterion, wherein the first non-adaptive VM model satisfies the first quality criterion if principal contributors for the first non-adaptive VM model match principal contributors for the second non-adaptive VM model.

10. The computer readable storage medium of claim 7, wherein the first data set includes historical data, the second data set includes at least one of historical data or design of experiments (DOE) data, and the third data set includes at least one of historical data or real time data.

11. The computer readable storage medium of claim 7, wherein the first quality criterion is a first squared correlation coefficient (R-squared) threshold and the second quality criterion is a second squared correlation coefficient (R-squared) threshold that is higher the first R-squared threshold.

12. The computer readable storage medium of claim 1, wherein the first R-squared threshold is approximately 0.5 and the second R-squared threshold is approximately 0.7.

13. The computer readable storage medium of claim 7, wherein the first quality criterion is a first residuals threshold and the second quality criterion is a second residuals threshold that is more stringent than the first residuals threshold.

14. A computing apparatus comprising:

a memory to store instructions for a virtual metrology component; and a processing device to execute the instructions, wherein the instructions cause the processing device to:

develop a first non-adaptive virtual metrology (VM) model for a manufacturing process based on performing a first regression using a first data set;

upon determining that an accuracy of the first non-adaptive VM model satisfies a first quality criterion, develop an adaptive VM model for the manufacturing process based on performing a second regression using at least one of the first data set or a second data set;

evaluate an accuracy of the adaptive VM model using a third data set that is at least one of a) larger than the first data set and the second data set or b) representative of a current application environment; and determine that the adaptive VM model is ready for use in production upon determining that an accuracy of the adaptive VM model satisfies a second quality criterion that is more stringent than the first quality criterion.

15. The computing apparatus of claim 14, wherein the first regression is non-adaptive partial least squares (PLS) regression, and wherein the second regression is adaptive PLS regression.

16. The computing apparatus of claim 14, wherein the first non-adaptive VM model is for a first chamber of a first manufacturing machine that performs the manufacturing processes, the instructions further to cause the processing device to:

develop a second non-adaptive VM model for a second chamber of the first manufacturing machine or of a second manufacturing machine that performs the manufacturing process based on performing the second regression using a fourth data set; and compare the first non-adaptive VM model to the second non-adaptive VM model to determine whether the first non-adaptive VM model satisfies the first quality criterion, wherein the first non-adaptive VM model satisfies the first quality criterion if principal contributors for the first non-adaptive VM model match principal contributors for the second non-adaptive VM model.

17. The computing apparatus of claim 14, wherein the first data set includes historical data, the second data set includes at least one of historical data or design of experiments (DOE) data, and the third data set includes at least one of historical data or real time data.

18. The computing apparatus of claim 14, wherein the first quality criterion is a first squared correlation coefficient (R-squared) threshold and the second quality criterion is a second squared correlation coefficient (R-squared) threshold that is higher the first R-squared threshold.

19. The computing apparatus of claim 18, wherein the first R-squared threshold is approximately 0.5 and the second R-squared threshold is approximately 0.7.

20. The computing apparatus of claim 14, wherein the first quality criterion is a first residuals threshold and the second quality criterion is a second residuals threshold that is more stringent than the first residuals threshold.

* * * * *